US012571159B2

(12) United States Patent
Hayashi et al.

(10) Patent No.: US 12,571,159 B2
(45) Date of Patent: Mar. 10, 2026

(54) AQUEOUS INK FOR TEXTILE INKJET PRINTING AND METHOD FOR PRODUCING PRINTED TEXTILE ITEM

(71) Applicant: RISO KAGAKU CORPORATION, Tokyo (JP)

(72) Inventors: Akiko Hayashi, Tokyo (JP); Tetsuya Shiraishi, Tokyo (JP)

(73) Assignee: RISO KAGAKU CORPORATION, Tokyo (JP)

(*) Notice: Subject to any disclaimer, the term of this patent is extended or adjusted under 35 U.S.C. 154(b) by 150 days.

(21) Appl. No.: 18/474,623

(22) Filed: Sep. 26, 2023

(65) Prior Publication Data

US 2024/0110331 A1    Apr. 4, 2024

(30) Foreign Application Priority Data

Sep. 29, 2022    (JP) ................................. 2022-156218

(51) Int. Cl.
| | |
|---|---|
| *D06P 5/30* | (2006.01) |
| *B41J 2/01* | (2006.01) |
| *B41J 2/21* | (2006.01) |
| *C09D 11/102* | (2014.01) |
| *C09D 11/104* | (2014.01) |
| *C09D 11/107* | (2014.01) |
| *C09D 11/322* | (2014.01) |
| *C09D 11/40* | (2014.01) |
| *C09D 11/54* | (2014.01) |
| *D06P 1/52* | (2006.01) |

(52) U.S. Cl.
CPC . *D06P 5/30* (2013.01); *B41J 2/01* (2013.01); *B41J 2/2107* (2013.01); *C09D 11/102* (2013.01); *C09D 11/104* (2013.01); *C09D 11/107* (2013.01); *C09D 11/322* (2013.01); *C09D 11/40* (2013.01); *C09D 11/54* (2013.01); *D06P 1/5285* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13;

B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | | | | |
|---|---|---|---|---|---|
| 4,996,252 | A | * | 2/1991 | Phan ...................... | C09D 11/10 |
| | | | | | 347/100 |
| 8,328,340 | B2 | | 12/2012 | Ogawa et al. | |
| 11,407,244 | B2 | | 8/2022 | Miyasa et al. | |
| 11,566,141 | B2 | | 1/2023 | Sato et al. | |
| 2009/0176070 | A1 | * | 7/2009 | Goto ................... | C09D 11/326 |
| | | | | | 427/256 |
| 2010/0214352 | A1 | * | 8/2010 | Tsunoda ............... | C09D 11/322 |
| | | | | | 524/386 |
| 2010/0295891 | A1 | * | 11/2010 | Goto ..................... | C09D 11/54 |
| | | | | | 347/21 |
| 2016/0319142 | A1 | * | 11/2016 | Arai ........................... | B41J 2/01 |
| 2017/0314194 | A1 | * | 11/2017 | Arai ........................... | B41J 2/01 |
| 2018/0030301 | A1 | * | 2/2018 | Yamazaki .............. | B41J 3/4078 |
| 2018/0237987 | A1 | * | 8/2018 | Urano ................... | C09D 11/40 |
| 2019/0352528 | A1 | * | 11/2019 | Yamazaki ........... | C09D 11/322 |
| 2020/0002561 | A1 | * | 1/2020 | Hayashi ............... | C09D 11/322 |

FOREIGN PATENT DOCUMENTS

| | | |
|---|---|---|
| JP | 2009-030014 | 2/2009 |
| JP | 2009-096914 | 5/2009 |
| JP | 2019-031611 | 2/2019 |
| JP | 2021-070880 | 5/2021 |

* cited by examiner

*Primary Examiner* — Manish S Shah
(74) *Attorney, Agent, or Firm* — HSML P.C.

(57) ABSTRACT

Provided is an aqueous ink for textile inkjet printing including a pigment, a binder resin, and water, wherein the binder resin contains a water-dispersible (meth)acrylic resin, a water-dispersible urethane resin, and a water-dispersible polyester resin, and a mass ratio of the water-dispersible polyester resin relative to the water-dispersible urethane resin is at least 0.2. A method for producing a printed textile item is also provided.

19 Claims, No Drawings

AQUEOUS INK FOR TEXTILE INKJET PRINTING AND METHOD FOR PRODUCING PRINTED TEXTILE ITEM

CROSS REFERENCE TO RELATED APPLICATIONS

This application is based upon and claims the benefit of priority from the prior Japanese Patent Application No. 2022-156218, filed on Sep. 29, 2022, the entire contents of which are incorporated by reference herein.

BACKGROUND OF THE INVENTION

Field of the Invention

Embodiments of the present invention relate to an aqueous ink for textile inkjet printing, and a method for producing a printed textile item.

Description of the Related Art

Among methods for printing images such as text, pictures, or designs onto fabrics or the like such as woven fabrics, knitted fabrics, and nonwoven fabrics, in addition to screen printing methods and roller textile printing methods, textile inkjet printing methods using direct methods which enable image processing to be performed by computer and textile printing to be performed in a substantially plateless manner are recently attracting considerable attention.

The textile inkjet printing method also has an advantage of being more applicable than other textile printing methods in that images can be printed on fabrics without contact.

For textile printing onto fabrics, aqueous inks are suitable from the viewpoint of preventing the deterioration of fabrics caused by solvents and environmental safety.

There are known textile inkjet printing inks containing a water-dispersible urethane resin in order to obtain washing fastness of printed textile items.

JP 2019-31611 A discloses an ink composition for textile inkjet printing which contains a pigment, a water-dispersible resin, a crosslinking agent, and water, and in which a urethane resin whose elongation at break and tensile strength satisfy a predetermined range is used as the water-dispersible resin.

JP 2009-96914 A discloses an ink for textile inkjet printing which contains a pigment, a water-dispersible resin, water, and a water-soluble organic solvent, and in which a urethane resin whose glass transition temperature satisfies a predetermined range is used as the water-dispersible resin.

In addition, as a method for performing textile printing on a fabric having a dark color such as black, methods are known in which a fabric has a pretreatment liquid applied thereto and is dried, a white ink is printed on the pre-treated surface, and the desired color ink is printed on the white ink printed surface to obtain a printed textile item having a color image (JP 2009-30014 A and JP 2021-70880 A).

SUMMARY OF THE INVENTION

One embodiment of the disclosure relates to an aqueous ink for textile inkjet printing including a pigment, a binder resin, and water, wherein the binder resin contains a water-dispersible (meth)acrylic resin, a water-dispersible urethane resin, and a water-dispersible polyester resin, and a mass ratio of the water-dispersible polyester resin relative to the water-dispersible urethane resin is at least 0.2.

Another embodiment of the disclosure relates to a method for producing a printed textile item, the method including applying the aqueous ink for textile inkjet printing according to one embodiment as described above to a substrate using an inkjet method.

DETAILED DESCRIPTION OF THE EMBODIMENTS

The present invention is described below using embodiments. The present invention is not limited by the examples in the following embodiments.

<Aqueous Ink for Textile Inkjet Printing>

When a white ink is printed on a dark colored substrate and a color ink is printed on the white undercoat layer, as compared to when a color ink is printed on a light colored substrate, the color development of the color ink may not be fully exhibited. Although a textile inkjet printing ink containing a urethane resin as a binder resin is excellent in terms of washing fastness, it is also desirable to improve the storage stability of the ink.

An aqueous ink for textile inkjet printing according to one embodiment contains a pigment, a binder resin, and water, wherein the binder resin contains a water-dispersible (meth)acrylic resin, a water-dispersible urethane resin, and a water-dispersible polyester resin, and a mass ratio of the water-dispersible polyester resin relative to the water-dispersible urethane resin is 0.2 or more. According to this embodiment, an aqueous ink for textile inkjet printing can be provided having excellent washing fastness and color development of printed textile items and excellent storage stability of the ink.

Hereinafter, "aqueous ink for textile inkjet printing" is sometimes simply referred to as "textile printing ink" or "ink". In this specification, (meth)acrylic resin is a generic term for a homopolymer or a copolymer containing at least one of a methacrylic unit and an acrylic unit. (Meth)acrylic unit means a methacrylic unit, an acrylic unit, or both of these. (Meth)acrylate means methacrylate, acrylate, or both of these.

By including a water-dispersible (meth)acrylic resin, a water-dispersible urethane resin, and a water-dispersible polyester resin, as a combination of binder resins in the textile printing ink, the washing fastness and color development of printed textile items can be improved and further the storage stability of the ink can be improved. The reasons for this will be described below, but the present invention is not bound by the following theories.

When a water-dispersible urethane resin is used as a binder resin to improve the washing fastness of printed textile items, the color development of printed textile items may not be sufficiently obtained. This phenomenon becomes more apparent when a color ink is applied to a dark colored substrate than when a color ink is applied to a light colored substrate. In addition, when a white ink is applied to a dark colored substrate as a white undercoat layer and then a color ink is applied, the color development of printed textile items tends to decrease. In particular, the color development of printed textile items tends to decrease when a color ink is applied using a wet-on-wet method to a substrate to which a white ink has been applied.

In the present invention, it has been found that by using a combination of a water-dispersible (meth)acrylic resin and a water-dispersible urethane resin as a binder resin, the decrease in color development of a printed textile item is suppressed without impairing the washing fastness resulting from the water-dispersible urethane resin.

By using a water-dispersible (meth)acrylic resin in combination with a water-dispersible urethane resin as a binder resin, it is possible to improve the color development of printed textile items, especially when a color ink is applied using the wet-on-wet method to a substrate to which a white ink has been applied. The mechanism is not entirely clear, but the following is feasible.

It is thought that one of the causes of the decrease in color development of printed textile items is excessive aggregation of pigment particles of color inks on the surface of the substrate. As the number of pigment particles decreases as the aggregation of pigments proceeds, unevenness occurs in the distribution of pigments, and this may cause the substrate to be exposed. It is thought that the inclusion of a water-dispersible (meth)acrylic resin in the binder resin may suppress the aggregation of pigment particles on the surface of the substrate, and good color development may be maintained. This may be due to the fact that a water-dispersible (meth)acrylic resin has a property of easily adsorbing to pigments and a property of not easily aggregating even with loss of electric charge.

(1) A water-dispersible (meth)acrylic resin has fewer hydrophilic groups than a water-dispersible urethane resin, and dispersion stability is often implemented using an emulsifier or surfactant. Since the dispersion stability depends not only on electrostatic repulsion but also on solvation and steric hindrance of the molecular structure, aggregation accompanying water evaporation is less likely to occur after a textile printing ink lands on a substrate.

(2) A water-dispersible (meth)acrylic resin tends to be more hydrophobic than a water-dispersible urethane resin. Therefore, it is thought that a water-dispersible (meth)acrylic resin has a high affinity with pigments and easily adsorbs to pigments.

That is, after the textile printing ink lands on a substrate, the water-dispersible (meth)acrylic resin and pigment particles are distributed as a set on the surface of the substrate (according to (2) above), the water-dispersible (meth)acrylic resin is unlikely to aggregate after landing (according to (1) above), and thus the water-dispersible (meth)acrylic resin and pigment particles are fixed and dried as a set on the surface of the substrate. Thus, aggregation of pigment particles is avoided during the fixing process. It is thought that since the pigment particles do not aggregate with each other, the mechanism described above suppresses the decrease in color development and thus good color development is obtained.

When the surface of a substrate on which the textile printing ink lands is wet, aggregation of pigment particles is more likely to progress after the textile printing ink lands, and decrease in color development is likely to become apparent. In comparison, when the surface of a substrate on which the textile printing ink lands is dry, decrease in color development is less likely to become apparent. Thus, when the textile printing ink is printed after the substrate has a pretreatment liquid applied thereto and dried, decrease in color development is less likely to become apparent. In contrast, when the textile printing ink is printed using the wet-on-wet method after the substrate is given a pretreatment liquid, aggregation of pigment particles is more likely to progress after the textile printing ink lands, and decrease in color development is more likely to become apparent. Even in such a printing method, the decrease in color development of printed items can be prevented by using the textile printing ink according to one embodiment. The method of printing with the textile printing ink using the wet-on-wet method without providing a drying step after the application of a pretreatment liquid has an advantage that the process can be simplified.

Meanwhile, the present invention focuses on the fact that when a water-dispersible (meth)acrylic resin and a water-dispersible urethane resin are combined in the textile printing ink, the change in viscosity over time becomes large and storage stability is impaired. Since inkjet heads have a range of ink viscosity that they can accommodate, when the ink viscosity changes to the extent that it is outside the acceptable range, it may lead to poor jetting and cause the quality of printed textile items to deteriorate.

When the textile printing ink containing a combination of a water-dispersible (meth)acrylic resin and a water-dispersible urethane resin further contains a water-dispersible polyester resin, good storage stability of the ink can be maintained. This mechanism is also not entirely clear, but the following properties are thought to have an effect.

A water-dispersible urethane resin often relies on electrostatic repulsion for dispersion stability. Hydrophobic substances, examples thereof including a free emulsifier, a free dispersant, and a surfactant, are present in the textile printing ink, and one or some of these adsorb to the water-dispersible urethane resin. At this time, the hydrophobic substances adsorb to the water-dispersible urethane resin, and thus the electrostatic repulsive force of the water-dispersible urethane resin decreases. In addition, when the attraction between particles of the water-dispersible urethane resin is strong, the ink viscosity increases. When the attraction becomes too strong and coalescing between particles of the water-dispersible urethane resin proceeds, the ink viscosity may decrease because the number of particles in the textile printing ink decreases. Here, when a water-dispersible polyester resin is used in combination, hydrophobic substances that have adsorbed on the water-dispersible urethane resin preferentially adsorb on the water-dispersible polyester resin instead of the water-dispersible urethane resin. This is probably because the polarity of polyester is closer to that of hydrophobic substances in the ink than that of urethane. This can suppress the change in ink viscosity.

From such a viewpoint, in the present invention, it has been found that the mass ratio of the water-dispersible polyester resin relative to the water-dispersible urethane resin may be a factor for controlling the change in the ink viscosity. That is, when the mass ratio of the water-dispersible polyester resin relative to the water-dispersible urethane resin is 0.2 or more, the change in ink viscosity can be more effectively suppressed. This mass ratio is more preferably 0.3 or more, and even more preferably 0.4 or more. Although not particularly limited, this mass ratio is preferably 2 or less, more preferably 1.5 or less, and even more preferably 1 or less. For example, this mass ratio may be 0.2 to 2, 0.3 to 1.5, or 0.4 to 1.

The textile printing ink contains a water-dispersible resin as a binder resin. The water-dispersible resin can be dispersed in a particulate form without dissolving in water, thus forming an oil-in-water (O/W) emulsion. During ink production, the water-dispersible resin can be blended as an oil-in-water resin emulsion, for example. The water-dispersible resin may be a self-emulsifying resin in which a hydrophilic group and/or a hydrophilic segment is introduced for stable dispersion in water, or may be water-dispersible by using an external emulsifier. The water-dispersible resin is preferably a resin that forms a transparent coating film so as not to affect the color tone of pigments.

The water-dispersible resin may be any of anionic, cationic, amphoteric, and nonionic resins. Considering the dispersion stability of pigments in the textile printing ink, an anionic resin, an amphoteric resin, a nonionic resin, or a combination of these can be preferably used, and an anionic resin is used more preferably. As the water-dispersible resin, an anionic resin having an anionic functional group such as carboxy, sulfo, and phosphate groups are preferable.

The water-dispersible resin is preferably present as resin particles in the ink. The average particle size of the resin particles is preferably 500 nm or less, more preferably 400 nm or less, and even more preferably 300 nm or less from the viewpoint of jetting characteristics. For example, the average particle size of the resin particles is preferably in a range of 10 to 500 nm. It is also preferable that the average particle size of the resin particles in the resin emulsion to be fed into the ink satisfy these ranges. Here, the average particle size of the resin particles refers to the volume-based average particle size and is a numerical value measured using a dynamic light scattering method.

The water-dispersible (meth)acrylic resin is a (meth) acrylic resin that has water dispersibility and can disperse in water in a particulate form. The water-dispersible (meth) acrylic resin can be blended into the textile printing ink as an oil-in-water resin emulsion.

The (meth)acrylic resin is a homopolymer or copolymer having a methacrylic unit, an acrylic unit, or a combination thereof. Generally, the (meth)acrylic resin can be synthesized by polymerizing a methacrylic-based monomer, an acrylic-based monomer, or a combination thereof. Examples of the methacrylic-based monomer and the acrylic-based monomer include a methacrylic acid derivative such as methacrylic acid, acrylic acid, and a methacrylate ester, and an acrylic acid derivative such as an acrylate.

The water-dispersible (meth)acrylic resin may contain another unit in addition to the methacrylic unit and acrylic unit. Examples of the other unit include units derived from monomers such as unsaturated carboxylic acid-based monomers, styrene-based monomers, nitrogen atom-containing unsaturated monomers, vinyl-based monomers, unsaturated alcohols, vinyl ether-based monomers, vinyl ester-based monomers, epoxy group-containing unsaturated monomers, sulfonic acid group-containing unsaturated monomers, and alkoxysilyl group-containing ethylenic unsaturated monomers.

As an example of the water-dispersible (meth)acrylic resin, a water-dispersible styrene (meth)acrylic resin may be used. The water-dispersible styrene (meth)acrylic resin is a copolymer containing a (meth)acrylic unit and a styrene unit. Examples of the styrene unit can include units derived from monomers such as styrene, alkyl-substituted styrene (e.g., α-methylstyrene, etc.), and halogen-substituted styrene (e.g., 2-chlorostyrene, etc.).

Commercial examples of the water-dispersible (meth) acrylic resin include the NeoCryl series (A-1094, A-6016, XK-190, BT-62) manufactured by DSM Japan K.K., the Mowinyl series (7320, 6899D, 6810, 6750, 6718, 6760, 6770) manufactured by Japan Coating Resin Corporation, the Microgel series (E-1002, E-5002) manufactured by Nippon Paint Co., Ltd., the VONCOAT series (4001, 5454, VF-1060, IJ-8000) manufactured by DIC Corporation, the Nipol series (LX855, LX811) and SAE1014 manufactured by Zeon Corporation, the JONCRYL series (7100, 390, 711, 511, 7001, 632, 741, 450, 840, 62J, HRC-1645J, 734, 852, 7600, 775, 537J, 1535, PDX-7630A, 352J, 352D, PDX-7145, 538J, 7640, 7641, 631, 790, 780, 7610) manufactured by BASF Japan Ltd., the NK binder series manufactured by SHIN-NAKAMURA CHEMICAL Co., Ltd., and the Saivy-nol series manufactured by SAIDEN CHEMICAL INDUS- TRY CO., LTD. (all product names). A single water-dispersible (meth)acrylic resin may be used alone, or a combination of two or more water-dispersible (meth)acrylic resins may be used.

The glass transition temperature (Tg) of the water-dispersible (meth)acrylic resin is not particularly limited, and is preferably −50 to 20° C., and more preferably −40 to 10° C., from the viewpoint of obtaining flexibility of ink coating films and further enhancing rubbing fastness of printed textile items. Here, the glass transition temperature of the resin is a numerical value measured according to differential scanning calorimetry (DSC) (the same applies hereinafter).

The water-dispersible urethane resin is a urethane resin that has water dispersibility and can disperse in water in a particulate form. The water-dispersible urethane resin can be blended into the textile printing ink as an oil-in-water resin emulsion.

A urethane resin is a polymer having a urethane linkage. Generally, a urethane resin can be synthesized through polyaddition of polyisocyanate and polyol. Examples of the urethane resin used include polyether urethane resins that contain ether linkages in the main chain in addition to the urethane linkages, polyester urethane resins that contain ester linkages in the main chain in addition to the urethane linkages, polycarbonate urethane resins that contain carbonate linkages in the main chain in addition to the urethane linkages, and polyester/ether urethane resins that contain ester linkages and ether linkages in the main chain in addition to the urethane linkages. One of these water-dispersible urethane resins can be used alone, or a combination of two or more of these water-dispersible urethane resins may be used.

As the water-dispersible urethane resin, anionic urethane resins having an anionic functional group such as a carboxy group, sulfo group, or phosphate group are preferable.

Commercial examples of the water-dispersible urethane resin include the Impranil series (DLP-R, DLU, DLF) manufactured by Sumika Covestro Urethane Co., Ltd., the SUPERFLEX series (300, 420, 460, 470, 500M, 740, 150HS) manufactured by DKS Co. Ltd., the DAOTAN series (TW6490/35WA, TW6492/35WA, TW6493/35WA, TW6450/35WA, VTW6463/36WA) manufactured by DAICEL-ALLNEX LTD., the TAKELAC series (W-6061, W-6010) manufactured by Mitsui Chemicals, Inc., and UW-1701F and UW-1005D-C1 manufactured by UBE Corporation (all product names). A single water-dispersible urethane resin may be used alone, or a combination of two or more water-dispersible urethane resins may be used.

The glass transition temperature (Tg) of the water-dispersible urethane resin is not particularly limited, and from the viewpoint of obtaining softness of ink coating films and further enhancing rubbing fastness of printed textile items, is preferably −50 to 50° C., and more preferably −10 to 30° C.

The water-dispersible polyester resin is a water-dispersible polyester resin that has water dispersibility and can disperse in water in a particulate form. The water-dispersible polyester resin can be blended into the textile printing ink as an oil-in-water resin emulsion. A polyester resin is a polymer having an ester linkage in the structure of the main chain and may be generally synthesized through polycondensation of a polyalcohol and a polycarboxylic acid.

Commercial examples of the water-dispersible polyester resin include the elite1 series (KT-0507, KT-8701, KT-8803, KT-9204, KT-9511, KA-1449S, KA-5071S) manufactured by UNITIKA LTD., and the VYLONAL series (MD-1100, MD-1200, MD-1245, MD-1335, MD-1480, MD-1500, MD-1930, MD-1985, MD-2000) manufactured by TOYOBO CO., LTD (both of the above are product names). A single water-dispersible polyester resin may be used alone, or a combination of two or more water-dispersible polyester resins may be used.

The number average molecular weight of the water-dispersible polyester resin is not particularly limited, and for example, is preferably 7,000 to 500,000, more preferably 10,000 to 200,000, and even more preferably 12,000 to 100,000. In these ranges, the water dispersibility is well maintained in the textile printing ink and storage stability can be further improved. In addition, when the number average molecular weight of the water-dispersible polyester resin is 7,000 or more, ink coating film strength can be obtained and the washing fastness of printed textile items can be further improved. The number average molecular weight of the water-dispersible polyester resin is obtained as a polystyrene-equivalent value using gel permeation chromatography (GPC) analysis.

The glass transition temperature (Tg) of the water-dispersible polyester resin is not particularly limited, and is preferably −50 to 120° C., more preferably 0 to 100° C., and even more preferably 50 to 85° C.

The mass ratio of the water-dispersible (meth)acrylic resin relative to the water-dispersible urethane resin is preferably 0.2 to 5. When this mass ratio is 0.2 or more, aggregation of pigment particles on the surface of a substrate is suppressed more, and decrease in color development of printed textile items can be suppressed more. From such a viewpoint, this mass ratio is more preferably 0.3 or more, and even more preferably 0.4 or more. When this mass ratio is 5 or less, washing fastness can be further improved. From such a viewpoint, this mass ratio is more preferably 3 or less, even more preferably 2 or less, and yet more preferably 1.5 or less.

The mass ratio of the water-dispersible (meth)acrylic resin relative to the pigment is preferably 0.5 or more, more preferably 0.8 or more, and even more preferably 1 or more, from the viewpoint of further improving the color development of printed textile items. The mass ratio of the water-dispersible (meth)acrylic resin relative to the pigment is not particularly limited, but is preferably 3 or less, more preferably 2 or less, and even more preferably 1.5 or less.

The mass ratio of the water-dispersible urethane resin relative to the pigment is preferably 0.5 or more, more preferably 0.8 or more, and even more preferably 1 or more, from the viewpoint of further improving washing fastness. The mass ratio of the water-dispersible urethane resin relative to the pigment is not particularly limited, but is preferably 5 or less, more preferably 3 or less, and even more preferably 2 or less.

The mass ratio of the water-dispersible polyester resin relative to the pigment is preferably 0.3 or more, more preferably 0.5 or more, even more preferably 0.8 or more, and yet more preferably 1 or more, from the viewpoint of further improving the storage stability of the ink. The mass ratio of the water-dispersible polyester resin relative to the pigment is not particularly limited, but is preferably 3 or less, more preferably 2 or less, and even more preferably 1.5 or less.

The total mass of the water-dispersible (meth)acrylic resin, water-dispersible urethane resin, and water-dispersible polyester resin is, as a mass ratio relative to the pigment, preferably 1 to 10, more preferably 2 to 8, and even more preferably 3 to 5.

The total mass of the water-dispersible (meth)acrylic resin, water-dispersible urethane resin, and water-dispersible polyester resin is, expressed as the resin fraction amount relative to the total mass of the textile printing ink, preferably 1% to 30% by mass, more preferably 5% to 25% by mass, and even more preferably 10% to 20% by mass. In particular, from the viewpoint of enhancing the strength of the ink coating film and enhancing the washing fastness of printed textile items, the total mass of the water-dispersible (meth)acrylic resin, water-dispersible urethane resin, and water-dispersible polyester resin is preferably 10% by mass or more, more preferably 12% by mass or more, and more preferably 14% by mass or more relative to the total mass of the textile printing ink.

The amount of the water-dispersible (meth)acrylic resin is, relative to the total mass of the textile printing ink, preferably 1% to 10% by mass, and more preferably 2% to 8% by mass. The amount of the water-dispersible urethane resin is, relative to the total mass of the textile printing ink, preferably 1% to 15% by mass, and more preferably 2% to 10% by mass. The amount of the water-dispersible polyester resin is, relative to the total mass of the textile printing ink, preferably 0.5% to 8% by mass, and more preferably 1% to 5% by mass.

The textile printing ink may not contain yet another kind of binder resin other than the water-dispersible (meth)acrylic resin, water-dispersible urethane resin, and water-dispersible polyester resin. However, another kind of binder resin may be contained to the extent that the effect of the present invention is not impaired.

The textile printing ink contains a pigment. The pigment may be either a white pigment or a non-white pigment.

Pigments which can be used include organic pigments such as azo pigments, phthalocyanine pigments, polycyclic pigments, and dye lake pigments, and inorganic pigments such as carbon blacks and metal oxides. Examples of azo pigments include soluble azo lake pigments, insoluble azo pigments, and condensed azo pigments. Examples of phthalocyanine pigments include metal phthalocyanine pigments and metal-free phthalocyanine pigments. Examples of polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments, and diketopyrrolopyrroles (DPP). Examples of carbon blacks include furnace carbon black, lamp black, acetylene black, and channel black. Examples of metal oxides include titanium dioxide and zinc oxide. A single pigment may be used alone, or a combination of two or more pigments may be used.

From the viewpoints of the jetting stability and the storage stability, the average particle size of the pigment particles in the ink, expressed as the volume-based average value in a particle size distribution measured using a dynamic light scattering method, is preferably 300 nm or less, more preferably 150 nm or less, and even more preferably 100 nm or less.

A self-dispersing pigment may be used as the pigment. A self-dispersible pigment is a pigment in which a hydrophilic functional group has been introduced at the pigment surface using a chemical treatment or a physical treatment. The hydrophilic functional group introduced into the self-dispersing pigment is preferably a group that has ionicity, and by charging the pigment surface either anionically or cationically, the pigment particles can be stably dispersed in water by electrostatic repulsion. Preferred anionic functional groups include a carboxy group, a sulfo group, and a phosphate group. Preferred cationic functional groups include a quaternary ammonium group and a quaternary phosphonium group. These hydrophilic functional groups may be bonded directly to the pigment surface, or may be bonded via another atom grouping. Examples of this other atom grouping include, but are not limited to, an alkylene group, a phenylene group, and a naphthylene group. Examples of methods for treating the pigment surface include diazotization treatments, sulfonation treatments, hypochlorous acid treatments, humic acid treatments, and vacuum plasma treatments.

Examples of commercial products that can be used favorably as self-dispersing pigments include the CAB-O-JET series such as CAB-O-JET 200, CAB-O-JET 300, CAB-O-JET 250C, CAB-O-JET 260M, CAB-O-JET 270, and CAB-O-JET 450C manufactured by Cabot Corporation, and BONJET BLACK CW-1, BONJET BLACK CW-2, BONJET BLACK CW-3, and BONJET BLACK CW-4 manufactured by Orient Chemical Industries, Ltd. (all product names).

Pigment dispersions containing a pigment that has already been dispersed using a pigment dispersant may also be used. Examples of commercial products of pigment dispersions containing a pigment dispersed using a pigment dispersant include the HOSTAJET series manufactured by Clariant AG, and the FUJI SP series manufactured by Fuji Pigment Co., Ltd. A microencapsulated pigment in which a pigment has been coated with a resin may also be used as the pigment.

A single pigment may be used alone, or a combination of two or more pigments may be used. The amount of the pigment is, relative to the total mass of the ink, preferably 0.1% to 20% by mass, and more preferably 1% to 15% by mass, from the viewpoint of image density and ink viscosity.

A pigment dispersant typified by polymeric dispersants and surfactant-type dispersants may be preferably used for a pigment to be stably dispersed in a ink. Commercial examples of polymeric dispersants include the TEGO Dispers series such as TEGO Dispers 740W, TEGO Dispers 750W, TEGO Dispers 755W, TEGO Dispers 757W, and TEGO Dispers 760W manufactured by Evonik Japan Co., Ltd., the Solsperse series such as Solsperse 20000, Solsperse 27000, Solsperse 41000, Solsperse 41090, Solsperse 43000, Solsperse 44000, and Solsperse 46000 manufactured by The Lubrizol Corporation, the Joncryl series such as Joncryl 57, Joncryl 60, Joncryl 62, Joncryl 63, Joncryl 71, and Joncryl 501 manufactured by BASF Japan Ltd., DISPERBYK-102, DISPERBYK-185, DISPERBYK-190, DISPERBYK-193, and DISPERBYK-199 manufactured by BYK-Chemie Japan K.K., and Polyvinylpyrrolidone K-30 and Polyvinylpyrrolidone K-90 manufactured by DKS Co. Ltd. (all product names).

Examples of the surfactant-type dispersants include anionic surfactants including the DEMOL series such as DEMOL P, DEMOL EP, DEMOL N, DEMOL RN, DEMOL NL, DEMOL RNL, and DEMOL T-45 manufactured by Kao Corporation, and nonionic surfactants including the EMULGEN series such as EMULGEN A-60, EMULGEN A-90, EMULGEN A-500, EMULGEN B-40, EMULGEN L-40, and EMULGEN 420 manufactured by Kao Corporation (all product names).

A single pigment dispersant may be used alone, or a combination of two or more pigment dispersants may be used. When a pigment dispersant is used, the amount added in the ink varies depending on the type and is not particularly limited, but in general is preferably 0.005 to 0.5 as a mass ratio of the active component relative to a value of 1 for the pigment.

The textile printing ink contains water, and the main solvent may be water. For example, it is preferable that water be contained at a proportion that is the largest relative to the total mass of the solvent contained in the textile printing ink. There are no particular limitations on the water but it is preferably water in which the ionic components are as minimal as possible. In particular, from the viewpoint of storage stability of the textile printing ink, it is preferable that the amount of polyvalent metal ions such as calcium be low. Examples of water used include ion exchanged water, distilled water, and ultrapure water.

From the viewpoint of adjusting the ink viscosity, water is preferably contained, relative to the total mass of the textile printing ink, at 30% to 90% by mass, more preferably at 40% to 85% by mass, and even more preferably at 50% to 80% by mass.

The textile printing ink preferably further contains a water-soluble organic solvent. As the water-soluble organic solvent, an organic compound that is liquid at room temperature and is soluble in water can be used, and it is preferable to use a water-soluble organic solvent that mixes uniformly with an equal volume of water at one atmosphere and 20° C. Examples of the water-soluble organic solvent that may be used include lower alcohols such as methanol, ethanol, 1-propanol, isopropanol, 1-butanol, 2-butanol, isobutanol, and 2-methyl-2-propanol; glycols such as ethylene glycol, 1,2-propanediol, 1,3-propanediol, diethylene glycol, triethylene glycol, tetraethylene glycol, polyethylene glycol, propylene glycol, dipropylene glycol, tripropylene glycol, and polypropylene glycol; glycerols such as glycerol, digylcerol, triglycerol, and polyglycerol; acetins such as monoacetin and diacetin; glycol ethers such as ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, and tetraethylene glycol diethyl ether; triethanolamine; 1-methyl-2-pyrrolidone; 1,3-dimethyl-2-imidazolidinone; $\beta$-thiodiglycol; and sulfolane. The boiling point of the water-soluble organic solvent is preferably 100° C. or higher, and more preferably 150° C. or higher.

These water-soluble organic solvents may be used alone, or a combination of two or more of these water-soluble organic solvents may be used as long as a single phase is formed with water. The amount of the water-soluble organic solvent, which is the total amount when two or more water-soluble organic solvent are used, in the ink is preferably 5% to 50% by mass, and more preferably 10% to 35% by mass.

The textile printing ink can further contain a surfactant. Any of anionic, cationic, amphoteric, and nonionic surfactants may be used as the surfactant, but a nonionic surfactant is more preferable. In addition, either of a low-molecular weight surfactant or a high-molecular weight surfactant may be used. The HLB value of the surfactant is preferably 5 to 20, and more preferably 10 to 18.

Examples of the nonionic surfactants include ester-based surfactants such as glycerol fatty acid esters and fatty acid sorbitan esters; ether-based surfactants such as polyoxyethylene alkyl ethers, polyoxyethylene alkylphenyl ethers, and polyoxypropylene alkyl ethers; ether ester-based surfactants such as polyoxyethylene sorbitan fatty acid esters; acetylene-based surfactants; silicone-based surfactants; and fluo-
rine-based surfactants. Among these, acetylene-based sur-
factants such as acetylene glycol-based surfactants can be
preferably used.

Examples of the acetylene-based surfactants include
acetylene glycol-based surfactants, acetylene alcohol-based
surfactants, and surfactants having an acetylene group.
Acetylene glycol-based surfactants are glycols having an
acetylene group, are preferably glycols having a left-right
symmetrical structure with an acetylene group in the center,
and may include a structure in which ethylene oxide has
been added to acetylene glycol.

Examples of commercial products of acetylene-based
surfactants include the SURFYNOL series such as SURFY-
NOL 104E, SURFYNOL 104H, SURFYNOL 420, SURFY-
NOL 440, SURFYNOL 465, and SURFYNOL 485 manu-
factured by Evonik Industries AG, and the OLFINE series
such as OLFINE E1004, OLFINE E1010, and OLFINE
E1020 manufactured by Nissin Chemical Industry Co., Ltd.
(all product names).

Examples of the silicone-based surfactants include
polyether-modified silicone-based surfactants, alkyl-aralkyl-
commodified silicone-based surfactants, and acrylic sili-
cone-based surfactants. Examples of commercial products
of silicone-based surfactants include SILFACE SAG002 and
SILFACE 503A manufactured by Nisshin Chemical Indus-
try Co., Ltd. (both product names).

Further examples of other nonionic surfactants include
polyoxyethylene alkyl ether-based surfactants such as the
EMULGEN series such as EMULGEN 102KG, EMULGEN
103, EMULGEN 104P, EMULGEN 105, EMULGEN 106,
EMULGEN 108, EMULGEN 120, EMULGEN 147,
EMULGEN 150, EMULGEN 220, EMULGEN 350,
EMULGEN 404, EMULGEN 420, EMULGEN 705,
EMULGEN 707, EMULGEN 709, EMULGEN 1108,
EMULGEN 4085, and EMULGEN 2025G manufactured by
Kao Corporation (all product names).

Examples of the anionic surfactants include the EMAL
series such as EMAL 0, EMAL 10, EMAL 2F, EMAL 40,
and EMAL 20C, the NEOPELEX series such as
NEOPELEX GS, NEOPELEX G-15, NEOPELEX G-25
and NEOPELEX G-65, the PELEX series such as PELEX
OT-P, PELEX TR, PELEX CS, PELEX TA, PELEX SS-L,
and PELEX SS-H, and the DEMOL series such as DEMOL
N, DEMOL NL, DEMOL RN, and DEMOL MS, all manu-
factured by Kao Corporation (all product names).

Examples of the cationic surfactants include the ACET-
AMIN series such as ACETAMIN 24 and ACETAMIN 86,
the QUARTAMIN series such as QUARTAMIN 24P,
QUARTAMIN 86P, QUARTAMIN 60W, and QUAR-
TAMIN 86W, and the SANISOL series such as SANISOL C
and SANISOL B-50, all manufactured by Kao Corporation
(all product names).

Examples of the amphoteric surfactants include the
AMPHITOL series such as AMPHITOL 20BS, AMPHITOL
24B, AMPHITOL 86B, AMPHITOL 20YB, and AMPHI-
TOL 20N manufactured by Kao Corporation (all product
names).

One of the surfactants may be used alone, or a combina-
tion of two or more surfactants may be used. The amount of
the surfactant relative to the total mass of the textile printing
ink is preferably 0.1% to 5% by mass, and more preferably
0.2% to 2% by mass.

The textile printing ink may further contain another
component. Examples of the other component include pH
adjusters, preservatives, rust inhibitors, and antifoaming
agents.

There are no particular limitations on the method for
producing the textile printing ink, and production can be
performed using appropriate conventional methods. For
example, the textile printing ink may be obtained by using
a stirring device such as a three-one motor to disperse all of
the components, either in a single batch or in a number of
separate batches, and then passing the dispersion through a
filtration device such as a membrane filter if desired.

The viscosity of the textile printing ink may be adjusted
as appropriate, and for example, from the viewpoint of the
jetting characteristics, the viscosity at 23° C. is preferably 1
to 30 mPa·s. The ink viscosity can be measured, for
example, using a Rheometer MCR102 manufactured by
Anton Paar GmbH. From the viewpoint of the storage
stability of the ink, the pH of the textile printing ink is
preferably 7.0 to 10.0, and more preferably 7.5 to 9.0.

The aqueous ink for textile inkjet printing according to
one embodiment can be applied to fabrics to provide printed
textile items. Examples of the fabrics include woven fabrics,
knitted fabrics, and non-woven fabrics.

Examples of the fibers used for the fabrics include various
fibers. Specifically, examples of the fibers include inorganic
fibers such as metallic fibers, glass fibers, rock fibers, and
slag fibers; regenerated fibers of plant fibers such as cellu-
lose-based regenerated fibers (rayon, cupra, and the like);
semi-synthetic fibers (acetate, and the like) such as cellu-
lose-based fibers; synthetic fibers such as polyamide, poly-
ester, polyvinyl chloride, polyvinylidene chloride, polyacry-
lonitrile, polyvinyl alcohol, polyurethane, polyethylene,
polypropylene, polystyrene, and polyfluoroethylene; and
natural fibers such as cotton, hemp, silk, and wool. The
fabric may contain at least one type of fibers selected from
among various fibers as described above.

Polyester fibers, which in recent years have shown a
significant increase in consumption, tend to have fewer polar
groups than natural fibers such as cotton, and therefore
fixing pigment inks to the polyester fibers tends to be more
difficult, meaning ensuring favorable rubbing fastness for
fabrics containing polyester fibers tends to be problematic.
The textile printing ink according to one embodiment con-
tains a water-dispersible urethane resin, and this gives
flexibility to ink coating films and can further improve
rubbing fastness.

<Pretreatment Liquid>

In one embodiment, a substrate to which the textile
printing ink is applied may be a pretreated substrate or an
untreated substrate. By using a pretreated substrate, the
image quality of the ink image can be further enhanced and
the fixability of the ink image to the substrate can be further
enhanced. The pretreated substrate can be obtained by
applying a pretreatment liquid to the substrate.

The pretreatment liquid is not particularly limited, and
may include, for example, an aggregating agent such as a
metal salt or a cationic compound, a filler such as silica, or
the like. From the viewpoint of improving color develop-
ment, the pretreatment liquid preferably contains an aggre-
gating agent, and more preferably at least one selected from
the group consisting of a metal salt and a cationic com-
pound.

As the metal salt, a polyvalent metal salt can be preferably
used. Examples of the polyvalent metal salt include salts
such as calcium, magnesium, copper, nickel, zinc, and
barium. Specific examples of the polyvalent metal salt
include calcium chloride, calcium nitrate, magnesium
nitrate, copper nitrate, calcium acetate, and magnesium
acetate. A single polyvalent metal salt may be used alone, or
a combination of two or more polyvalent metal salts may be used. When the pretreatment liquid is sprayed on a substrate such as a fabric and is fixed using an iron, the pretreatment liquid itself is preferably colorless, and considering the possibility of coming into contact with the skin or the like, is more preferably a calcium salt that has no effect. The concentration of the polyvalent metal salt in the pretreatment liquid is preferably about 1% to 40% by mass, and more preferably about 10% to 30% by mass, from the viewpoint of the formation and fixability of ink coating films.

As the cationic compound, a water-soluble cationic compound may be used, for example. The cationic compound may be, for example, a cationic polymer, and is preferably a water-soluble cationic polymer. Examples of the cationic compound include polyethylenimine (PEI), polyvinylamine, polyallylamine and salts thereof, polyvinylpyridine, and copolymers of cationic acrylamide. A single cationic compound may be used alone, or a combination of two or more cationic compounds may be used. The concentration of the cationic compound in the pretreatment liquid is preferably about 0.1% to 20% by mass, and more preferably about 1% to 15% by mass, from the viewpoints of color development and texture.

The pretreatment liquid may further contain a water-dispersible resin from the viewpoints of ink adhesion and reducing fluffing of the substrate. The water-dispersible resin is not particularly limited, and for example, a (meth)acrylic resin, a (meth)acrylic-styrene resin, a urethane resin, a vinyl acetate resin, a (meth)acrylic-vinyl acetate resin, or a combination of two or more of these can be used.

Specific examples include the SUPERFLEX series such as SUPERFLEX 107M, SUPERFLEX 300, SUPERFLEX 361, SUPERFLEX E2000, SUPERFLEX E4000, and SUPERFLEX E4800 (all product names, manufactured by DKS Co. Ltd.), the Adeka BONTIGHTER series such as Adeka BONTIGHTER HUX-950 and Adeka BONTIGHTER HUX-290H (all product names, manufactured by Adeka Corporation), TAKELAC W-512A6 (product name, manufactured by Mitsui Chemicals, Inc.), and VINYBLAN 1225 and VINYBLAN 1245L (both product names, manufactured by Nisshin Chemical Industry Co., Ltd.). A single water-dispersible resin may be used alone, or a combination of two or more water-dispersible resins may be used.

The pretreatment liquid preferably contains water. The pretreatment liquid may contain a water-soluble organic solvent in addition to or instead of water. Details of the water and water-soluble organic solvent are as described above for the textile printing ink. The water-soluble organic solvent can be selected, for example, from those described above for the textile printing ink.

The amount of water is, relative to the total mass of the pretreatment liquid, preferably 30% to 90% by mass, more preferably 40% to 85% by mass, and more preferably 50% to 80% by mass. The amount of the water-soluble organic solvent is, relative to the total mass of the pretreatment liquid, preferably 5% to 50% by mass, more preferably 10% to 40% by mass, and even more preferably 15% to 30% by mass.

The pretreatment liquid may further contain a surfactant. The surfactant can be selected from, for example, those described above in the textile printing ink. The surfactant, expressed as an active component amount, is preferably 0.1% to 10% by mass, and more preferably 0.2% to 5% by mass, relative to the total mass of the pretreatment liquid.

The pretreatment liquid may further contain other components. Examples of other components include pH adjusters, preservatives, rust inhibitors, and antifoaming agents.

There are no particular limitations on the method for producing the pretreatment liquid, and production can be performed using appropriate conventional methods. For example, the textile printing ink may be obtained by using a stirring device such as a three-one motor to disperse all of the components, either in a single batch or in a number of separate batches, and then passing the dispersion through a filtration device such as a membrane filter if desired.

<Method for Producing Printed Textile Item>

A method for producing a printed textile item using the aqueous ink for textile inkjet printing according to one embodiment will be described below. According to one embodiment, a printed textile item can be produced by a method including applying the aqueous ink for textile inkjet printing to a substrate using an inkjet method. A pretreatment liquid may be applied to the substrate before the aqueous ink for textile inkjet printing is applied to the substrate.

A first example of a method for producing a printed textile item includes applying the textile printing ink to a substrate using an inkjet method, and in the example, a color image is formed using the textile printing ink. This example is suitable for textile printing on a light colored substrate such as white because no undercoat layer is formed. The substrate to which the textile printing ink is applied may be an untreated substrate or a pretreated substrate.

A step of applying a pretreatment liquid to the substrate may be further provided before the textile printing ink is applied. In this case, the textile printing ink may be applied to the substrate after the pretreatment liquid has been applied and dried. Alternatively, the textile printing ink may be applied to the substrate using the wet-on-wet method after the pretreatment liquid has been applied. The wet-on-wet method can simplify the process. In addition, the textile printing ink according to one embodiment can sufficiently obtain color development of printed textile items even in the wet-on-wet method. Specifically, the inclusion of a water-dispersible (meth)acrylic resin in the textile printing ink suppresses the aggregation of pigment particles on the surface of a substrate, and thus the excessive aggregation of pigment particles is suppressed and moderate aggregation occurs on the surface of the substrate to which the pretreatment liquid has been applied, thereby preventing the decrease in color development of printed textile items.

A second example of a method for producing a printed textile item includes applying to a substrate a white textile printing ink containing a white pigment to form an undercoat layer, and then applying to the substrate a color textile printing ink containing a non-white pigment, and in the example, a color image is formed using the color textile printing ink on the white undercoat layer, wherein the color textile printing ink is the aqueous ink for textile inkjet printing according to one embodiment as described above and is applied on the substrate using an inkjet method. This example is suitable for textile printing on a substrate having a dark color such as black because the substrate is concealed by the undercoat layer.

Note that when the ink for forming an undercoat layer is a color textile printing ink containing a non-white pigment, the method may include forming a non-white undercoat layer and forming a white image using a white textile printing ink on the non-white undercoat layer, wherein the white textile printing ink may be the aqueous ink for textile inkjet printing according to the above-described one embodiment and may be applied to the substrate using an inkjet method.

As in the first example above, a substrate to which the white textile printing ink is applied may be an untreated substrate or a pretreated substrate. A step of applying a pretreatment liquid to the substrate may be further provided before the white textile printing ink is applied.

In the second example, it is preferable that the white textile printing ink be applied to the substrate and the color textile printing ink be applied using the wet-on-wet method. The wet-on-wet method can simplify the process. In addition, it is also possible for the white textile printing ink and the color textile printing ink to be continuously jetted onto the substrate using a single inkjet printer. The textile printing ink according to one embodiment can sufficiently obtain color development of printed textile items even in the wet-on-wet method. Note that the color textile printing ink may be applied to the substrate after the white textile printing ink has been applied and dried.

In the second example, at least one of the white textile printing ink and the color textile printing ink may be the aqueous ink for textile inkjet printing according to one embodiment as described above. When the wet-on-wet method is adopted to simplify the process, it is preferable from the viewpoint of obtaining sufficient color development of printed textile items that the color textile printing ink be the aqueous ink for textile inkjet printing according to one embodiment. In addition, when the color textile printing ink is the aqueous ink for textile inkjet printing according to one embodiment, the fastness of the coating film on the surface of the printed textile item can be enhanced and the washing fastness of the printed textile item can be further enhanced.

With respect to the color textile printing ink, a single color ink such as a magenta ink, cyan ink, yellow ink, or black ink may be used, or multiple color inks in which these inks are combined may be used.

The inkjet method is a printing method that can easily and freely form images on demand without there being any contact with a substrate. The inkjet method is not particularly limited and any method may be used such as a piezo method, an electrostatic method, or a thermal method. When an inkjet printer is used, it is preferable for droplets of a pretreatment liquid or ink to be jetted from an inkjet head based on a digital signal and for the jetted droplets to be adhered to a substrate. The inkjet printer may be a serial head type or a line head type.

Hereinafter, a method for producing a printed textile item will be described using an example in which, in the above-described second example, a pretreatment liquid, a white textile printing ink, and a color textile printing ink are applied to a substrate, and the aqueous ink for textile inkjet printing according to one embodiment is used for the color textile printing ink.

First, the step of applying a pretreatment liquid to a substrate will be described. The area to which the pretreatment liquid is applied may be an area of the same shape as an image formed with the white textile printing ink, a wider area containing the shape of the image formed with the white textile printing ink, or the entire surface of the substrate.

As a method for applying a pretreatment liquid to a substrate, for example, a pretreatment liquid may be applied uniformly to the surface of the substrate using a brush, roller, bar coater, air knife coater, spray, or the like, or the pretreatment liquid may be printed on the image area using a printing method such as an inkjet printing method, gravure printing method, flexographic printing method, or the like.

The amount of the pretreatment liquid applied to the substrate is preferably 5 to 200 $g/m^2$, more preferably 10 to 150 $g/m^2$, and even more preferably 15 to 100 $g/m^2$.

Next, the step of applying a white textile printing ink to the substrate to which the pretreatment liquid has been applied will be described. The area to which the white textile printing ink is applied may be an area of the same shape as an image formed with the color textile printing ink, a wider area containing the shape of an image formed with the color textile printing ink, or the entire surface of the substrate.

As the method for applying the white textile printing ink to the substrate, any of an inkjet printing method, offset printing method, screen printing method, gravure printing method, flexographic printing method, or the like can be used, but the inkjet printing method is preferable.

The amount of the white textile printing ink applied to the substrate is not particularly limited but is preferably 80 to 450 $g/m^2$ and more preferably 120 to 400 $g/m^2$, for example.

Next, the step of applying a color textile printing ink using an inkjet method to a substrate to which a white textile printing ink has been applied will be described. The area to which the color textile printing ink is applied is preferably at least partially overlapped with the area to which the white textile printing ink is applied.

The amount of the color ink applied to the substrate is not particularly limited but, for example, is preferably 1 to 100 $g/m^2$ and more preferably 5 to 50 $g/m^2$. Note that one type of color ink may be applied, or two or more types of color inks may be applied.

The white textile printing ink may be applied to a substrate using the wet-on-wet method after the pretreatment liquid has been applied to the substrate, or the white textile printing ink may be applied to the substrate after the substrate has been dried. In the wet-on-wet method, the white textile printing ink is preferably applied without completely removing moisture from the substrate to which the pretreatment liquid has been applied. Preferably, the white textile printing ink can be applied while the substrate to which the pretreatment liquid has been applied remains wet. For example, the white textile printing ink is preferably applied to the substrate without performing a drying step such as heat drying after the pretreatment liquid has been applied to the substrate. Similarly, the color textile printing ink may be applied to the substrate using the wet-on-wet method after the white textile printing ink has been applied to the substrate, or the color textile printing ink may be applied to the substrate after the substrate has been dried.

A step of performing a heat treatment on the substrate can be further provided after the color textile printing ink has been applied. This can fix the ink image more effectively. The heat treatment temperature can be appropriately selected according to the material of the substrate, or the like. The heat treatment temperature is, for example, preferably 100° C. or higher, more preferably 120° C. or higher, and even more preferably 150° C. or higher. The heat treatment temperature is preferably 200° C. or lower from the viewpoint of reducing damage to the substrate. The heating device is not particularly limited, and for example, a heat press, a roll heater, a hot air device, an infrared lamp heater, or the like can be used. The heat treatment time can be set appropriately according to the heating method or the like, and is preferably 1 second to 10 minutes and may be 5 seconds to 5 minutes, for example.

The step of applying the pretreatment liquid, the step of applying the white textile printing ink, and the step of applying the color textile printing ink may be performed using separate printing devices or using one printing device.

For example, with two printing devices, the step of applying the pretreatment liquid may be performed using one of the printing devices, and the step of applying the white textile printing ink and the step of applying the color textile printing ink may be performed using the other printing device. In another example, the steps of applying the pretreatment liquid, the white textile printing ink, and the color textile printing ink may be performed using one printing device.

An overcoat layer may be formed on the substrate to which the white textile printing ink and the color textile printing ink have been applied. The overcoat layer can be formed by applying a post-treatment liquid to the substrate to which the ink has been applied. As the post-treatment liquid, for example, a post-treatment liquid containing an aqueous medium or an oily medium, and a resin capable of forming a coating film can be used. However, since a printed textile item obtained by using the aqueous ink for textile inkjet printing according to one embodiment has excellent washing fastness, the overcoat layer may not be provided.

<Ink Set>

According to one embodiment, an ink set can be provided which includes a white textile printing ink and a color textile printing ink and in which at least one of the white textile printing ink and the color textile printing ink is the aqueous ink for textile inkjet printing according to one embodiment as described above.

The ink set may further include a pretreatment liquid, a post-treatment liquid, or a combination thereof.

In some embodiments, in the ink set, the color textile printing ink may be the aqueous ink for textile inkjet printing according to one embodiment.

Examples

Hereinafter, the present invention will be described in detail using examples. The present invention is not limited to the following examples. In the following descriptions, "%" refers to "% by mass" unless otherwise specified. Raw materials whose manufacturer is not specifically described are available from Tokyo Chemical Industry Co., Ltd., FUJIFILM Wako Pure Chemical Corporation, and the like. For the amount shown in each table, a component blended as a solution or a dispersion is indicated as the total amount of the solution or dispersion. The "–" symbol in each table indicates not added or not calculable.

(Production of Pretreatment Liquid)

An amount of 20 g of calcium chloride, 19 g of diethylene glycol, 1 g of a surfactant OLFINE E1010 (product name, details are as follows), and 60 g of ion exchanged water were mixed and passed through a metal mesh having a pore size of 20 μm to remove foreign substances and obtain a pretreatment liquid.

(Production of White Pigment Dispersion)

An amount of 250 g of titanium oxide R62N (product name, SAKAI CHEMICAL INDUSTRY CO., LTD.) as a white pigment, and 10 g of DEMOL EP (product name, Kao Corporation) as a pigment dispersant (2.5 g of active component) were mixed with 740 g of ion exchanged water, and zirconia beads having 0.5 mm Φ were dispersed using a beads mill DYNO-MILL KDL A-type (product name, SHINMARU ENTERPRISES CORPORATION) with a filling proportion of 80% and a residence time of 2 minutes to obtain a white pigment dispersion having a pigment fraction amount of 25% by mass.

(Production of White Ink)

A white ink was produced in the following procedure using the obtained white pigment dispersion. The white ink was obtained by mixing the following components and removing coarse particles using a 5-μm membrane filter. In the following components, the water-dispersible resin is SUPERFLEX 460 (product name, DKS Co. Ltd.), the surfactant is SURFYNOL 465 (product name, Evonik Industries AG), and ethylene glycol and glycerin are available from FUJIFILM Wako Pure Chemical Corporation.

Water-dispersible resin (solid fraction 38% by mass): 26.3% by mass
    White pigment dispersion (pigment fraction 25% by mass): 40% by mass
    Surfactant: 1% by mass
    Ethylene glycol: 10% by mass
    Glycerin: 10% by mass
    Ion exchanged water: 12.7% by mass
    Total: 100% by mass (Production of Black Ink)

Tables 1 and 2 show the black ink formulations. The black ink was produced by mixing the components shown in each table and removing coarse particles with a 3-μm membrane filter.

The components used are shown below.

Pigment dispersion, "HOSTAJET Black 0-PT" (product name): pigment fraction 15% by mass, Clariant (Japan) K.K.

(Meth)acrylic resin, "NeoCryl XK-190" (product name): resin fraction 45% by mass, DSM Japan K.K.

(Meth)acrylic resin, "Mowinyl 6760" (product name): resin fraction 45% by mass, Japan Coating Resin Corporation Urethane resin, "DAOTAN TW6450/30WA" (product name): resin fraction 30% by mass, DAICEL-ALLNEX LTD.

Urethane resin, "SUPERFLEX 470" (product name): resin fraction 38% by mass, DKS Co. Ltd.

Urethane resin, "ETAERNACOLL UW1005D-C1" (product name): resin fraction 30% by mass, UBE Corporation Polyester resin, "elite1 KT9511" (product name): resin fraction 30% by mass, UNITIKA LTD.

Polyester resin, "VYLONAL MD1200" (product name): resin fraction 34% by mass, TOYOBO CO., LTD.

Surfactant, "OLFINE E1010" (product name): active component 100% by mass, Nis sin Chemical Industry Co., Ltd.

Glycerin and diethylene glycol, which are water-soluble solvents, are available from FUJIFILM Wako Pure Chemical Corporation. Among the above components, the (meth)acrylic resins, urethane resins, and polyester resins are all water-dispersible resins and are blended into the ink as oil-in-water resin emulsions.

(Fabrics)

A white polyester T-shirt was used as the light colored fabric, and a black cotton T-shirt was used as the dark colored fabric. The polyester T-shirt was a Glimmer made of 100% polyester and manufactured by TOMS Co., Ltd. The cotton T-shirt was a Printstar made of 100% cotton and manufactured by TOMS Co., Ltd.

(Printing Method for a Polyester T-Shirt (White))

Printing was performed in the following procedure using the pretreatment liquid and black ink obtained above.

(1) The pretreatment liquid was loaded into an "MMP8130" (product name) inkjet printer manufactured by Mastermind Co., Ltd.
    (2) The black ink was loaded into an "MMP813BT-C" (product name) inkjet printer manufactured by Mastermind Co., Ltd.

(3) A solid image was printed by jetting the pretreatment liquid at a transfer amount of 10 g/m$^2$.

(4) After printing with the pretreatment liquid, a solid image of the black ink was printed by jetting the black ink at a transfer amount of 20 g/m$^2$ on the pretreatment liquid printed surface without providing a drying step.

(5) A printed textile item was obtained by heating at 160° C. for 2 minutes using a Hotronix Fusion heat press.

(Printing Method for a Cotton T-Shirt (Black))

Printing was performed in the following procedure using the pretreatment liquid, black ink, and white ink obtained above.

(1) The pretreatment liquid was loaded into an "MMP8130" (product name) inkjet printer manufactured by Mastermind Co., Ltd.

(2) The black ink and the white ink were loaded into an "MMP813BT-C" (product name) inkjet printer manufactured by Mastermind Co., Ltd.

(3) A solid image was printed by jetting the pretreatment liquid at a transfer amount of 50 g/m$^2$.

(4) After printing with the pretreatment liquid, a solid image of the white ink was printed by jetting the white ink at a transfer amount of 200 g/m$^2$ on the pretreatment liquid printed surface without providing a drying step.

(5) After printing the white ink, a solid image of the black ink was printed by jetting the black ink at a transfer amount of 20 g/m$^2$ on the white ink printed surface without providing a drying step.

(6) A printed textile item was obtained by heating at 160° C. for 2 minutes using a Hotronix Fusion heat press.

(Method for Evaluating Storage Stability)

Each black ink was packed in a 20 mL-volume glass bottle, sealed, and left in a thermostatic bath at 60° C. The viscosity of the ink was measured one day, one week, and one month after leaving the ink to determine the change in viscosity. The viscosity of the ink was measured at a cone angle of 1° and a diameter of 50 mm using a Rheometer MCR102 manufactured by Anton Paar GmbH, at 23° C. The change in viscosity was calculated using equation 1 below. Storage stability was determined using the following criteria.

$$100 \times (\text{viscosity after being left} - \text{initial viscosity})/\text{initial viscosity} \qquad \text{Equation 1}$$

A: the change in viscosity is within ±5% for all three cycles

B: the change in viscosity is within ±10% for all three cycles

C: the change in viscosity is more than +10% or less than −10% at least once (Method for Evaluating Washing Fastness)

The washing fastness of each printed textile item was evaluated according to AATCC 61 2A, which is an evaluation standard for washing fastness established by the American Association of Textile Chemists and Colorists, and determined using the following criteria.

S: grade 3.5 or higher

A: grade 2.5 or higher

B: grade 2 or higher

C: grade 1.5 or lower (Method for Evaluating Color Development)

For each printed textile item, the OD value of a solid image of the black ink was measured using a spectrophotometer, X-Rite eXact (product name, manufactured by X-Rite Inc.), and determined according to the following criteria.

S: OD value of 1.3 or more

A: OD value of 1.2 or more

B: OD value of 1.1 or more

C: OD value of less than 1.1

TABLE 1

| Unit: % by mass | | Resin (%) | Pigment (%) | Examples 1 | 2 | 3 | 4 | 5 |
|---|---|---|---|---|---|---|---|---|
| Pigment dispersion | Hostajet Black O-PT | | 15 | 26.7 | 26.7 | 26.7 | 26.7 | 26.7 |
| (Meth)acrylic resin | Neocryl XK-190 | 45 | | 11.8 | 11.8 | 5.1 | 11.8 | 17.1 |
| | Mowinyl 6760 | 45 | | — | — | — | — | — |
| Urethane resin | DAOTAN TW6450/30WA | 30 | | 17.7 | 21.0 | 31.0 | — | 10.0 |
| | SUPERFLEX 470 | 38 | | — | — | — | 16.6 | — |
| | ETAERNACOLL UW1005D-Cl | 30 | | — | — | — | — | — |
| Polyester resin | Elitel KT9511 | 30 | | 13.3 | 10.0 | 10.0 | 10.0 | 13.3 |
| | VYLONAL MD1200 | 34 | | — | — | — | — | — |
| Surfactant | OLFINE E1010 | | | 1.0 | 1.0 | 1.0 | 1.0 | 1.0 |
| Water-soluble solvent | Glycerin | | | 5.0 | 5.0 | 5.0 | 5.0 | 5.0 |
| | Diethylene glycol | | | 24.0 | 24.0 | 21.0 | 24.0 | 24.0 |
| Water | Ion exchanged water | | | 0.5 | 0.5 | 0.2 | 4.9 | 2.9 |
| Total mass of ink (% by mass) | | | | 100.0 | 100.0 | 100.0 | 100.0 | 100.0 |
| Pigment content (%) | | | | 4.0 | 4.0 | 4.0 | 4.0 | 4.0 |
| Resin content (%) | Total mass of resins | | | 14.6 | 14.6 | 14.6 | 14.6 | 14.7 |
| | (Meth)acrylic resin | | | 5.3 | 5.3 | 2.3 | 5.3 | 7.7 |
| | Urethane resin | | | 5.3 | 6.3 | 9.3 | 6.3 | 3.0 |
| | Polyester resin | | | 4.0 | 3.0 | 3.0 | 3.0 | 4.0 |

TABLE 1-continued

Ink formulations and evaluation results

| | | | | | | |
|---|---|---|---|---|---|---|
| Mass ratio of resins | Polyester resin/urethane resin | 0.75 | 0.48 | 0.32 | 0.48 | 1.33 |
| | (Meth)acrylic resin/urethane resin | 1.00 | 0.84 | 0.25 | 0.84 | 2.57 |
| | Urethane resin/pigment | 1.33 | 1.58 | 2.33 | 1.58 | 0.75 |
| | (Meth)acrylic resin/pigment | 1.33 | 1.33 | 0.58 | 1.33 | 1.93 |
| Storage stability | | A | A | A | A | A |
| Washing fastness | Polyester (white) | S | S | S | A | B |
| | Cotton (black) | S | S | S | S | S |
| Color development | Polyester (white) | S | S | S | S | S |
| | Cotton (black) | S | S | B | S | S |

| Unit: % by mass | | Resin (%) | Pigment (%) | Examples | | | | |
|---|---|---|---|---|---|---|---|---|
| | | | | 6 | 7 | 8 | 9 | 10 |
| Pigment dispersion | Hostajet Black O-PT | | 15 | 26.7 | 26.7 | 26.7 | 26.7 | 26.7 |
| (Meth)acrylic resin | Neocryl XK-190 | 45 | | 11.8 | 11.8 | 7.3 | — | 11.8 |
| | Mowinyl 6760 | 45 | | — | — | — | 11.8 | — |
| Urethane resin | DAOTAN TW6450/30WA | 30 | | — | 24.3 | 31.0 | 17.7 | 17.7 |
| | SUPERFLEX 470 | 38 | | — | — | — | — | — |
| | ETAERNACOLL UW1005D-C1 | 30 | | 21.0 | — | — | — | — |
| Polyester resin | Elitel KT9511 | 30 | | 10.0 | 6.7 | 6.7 | 13.3 | — |
| | VYLONAL MD1200 | 34 | | — | — | — | — | 11.8 |
| Surfactant | OLFINE E1010 | | | 1.0 | 1.0 | 1.0 | 1.0 | 1.0 |
| Water-soluble solvent | Glycerin | | | 5.0 | 5.0 | 5.0 | 5.0 | 5.0 |
| | Diethylene glycol | | | 24.0 | 24.0 | 21.0 | 24.0 | 24.0 |
| Water | Ion exchanged water | | | 0.5 | 0.5 | 1.3 | 0.5 | 2.0 |
| Total mass of ink (% by mass) | | | | 100.0 | 100.0 | 100.0 | 100.0 | 100.0 |
| Pigment content (%) | | | | 4.0 | 4.0 | 4.0 | 4.0 | 4.0 |
| Resin content (%) | Total mass of resins | | | 14.6 | 14.6 | 14.6 | 14.6 | 14.6 |
| | (Meth)acrylic resin | | | 5.3 | 5.3 | 3.3 | 5.3 | 5.3 |
| | Urethane resin | | | 6.3 | 7.3 | 9.3 | 5.3 | 5.3 |
| | Polyester resin | | | 3.0 | 2.0 | 2.0 | 4.0 | 4.0 |
| Mass ratio of resins | Polyester resin/urethane resin | | | 0.48 | 0.27 | 0.22 | 0.75 | 0.75 |
| | (Meth)acrylic resin/urethane resin | | | 0.84 | 0.73 | 0.35 | 1.00 | 1.00 |
| | Urethane resin/pigment | | | 1.58 | 1.83 | 2.33 | 1.33 | 1.33 |
| | (Meth)acrylic resin/pigment | | | 1.33 | 1.33 | 0.83 | 1.33 | 1.33 |
| Storage stability | | | | A | B | B | A | A |
| Washing fastness | Polyester (white) | | | S | S | S | S | S |
| | Cotton (black) | | | S | S | S | S | S |
| Color development | Polyester (white) | | | S | S | S | S | S |
| | Cotton (black) | | | S | S | A | S | S |

TABLE 2

Ink formulations and evaluation results

| Unit: % by mass | | Resin (%) | Pigment (%) | Comparative examples | | | | | | |
|---|---|---|---|---|---|---|---|---|---|---|
| | | | | 1 | 2 | 3 | 4 | 5 | 6 | 7 |
| Pigment dispersion | Hostajet Black O-PT | | 15 | 26.7 | 26.7 | 26.7 | 26.7 | 26.7 | 26.7 | 26.7 |
| (Meth)acrylic resin | Neocryl XK-190 | 45 | | 32.4 | — | — | 11.8 | 11.8 | — | 23.6 |
| | Mowinyl 6760 | 45 | | — | — | — | — | — | — | — |
| Urethane resin | DAOTAN TW6450/30WA | 30 | | — | 48.7 | — | 31.0 | 29.3 | 35.3 | — |
| | SUPERFLEX 470 | 38 | | — | — | 38.4 | — | — | — | — |
| | ETAERNACOLL UW1005D-C1 | 30 | | — | — | — | — | — | — | — |

TABLE 2-continued

| Ink formulations and evaluation results | | | | | | | | | |
|---|---|---|---|---|---|---|---|---|---|
| Unit: % by mass | | Resin (%) | Pigment (%) | Comparative examples | | | | | | |
| | | | | 1 | 2 | 3 | 4 | 5 | 6 | 7 |
| Polyester resin | Elitel KT9511 | 30 | | — | — | — | — | 1.7 | 13.3 | 13.3 |
| | VYLONAL MD1200 | 34 | | — | — | — | — | — | — | — |
| Surfactant | OLFINE E1010 | | | 1.0 | 1.0 | 1.0 | 1.0 | 1.0 | 1.0 | 1.0 |
| Water-soluble solvent | Glycerin | | | 5.0 | 5.0 | 5.0 | 5.0 | 5.0 | 5.0 | 5.0 |
| | Diethylene glycol | | | 24.0 | 18.0 | 24.0 | 24.0 | 24.0 | 18.0 | 24.0 |
| Water | Ion exchanged water | | | 10.9 | 0.6 | 4.9 | 0.5 | 0.5 | 0.7 | 6.4 |
| Total mass of ink (% by mass) | | | | 100.0 | 100.0 | 100.0 | 100.0 | 100.0 | 100.0 | 100.0 |
| Pigment content (%) | | | | 4.0 | 4.0 | 4.0 | 4.0 | 4.0 | 4.0 | 4.0 |
| Resin content (%) | Total mass of resins | | | 14.6 | 14.6 | 14.6 | 14.6 | 14.6 | 14.6 | 14.6 |
| | (Meth)acrylic resin | | | 14.6 | 0.0 | 0.0 | 5.3 | 5.3 | 0.0 | 10.6 |
| | Urethane resin | | | — | 14.6 | 14.6 | 9.3 | 8.8 | 10.6 | — |
| | Polyester resin | | | — | — | — | — | 0.5 | 4.0 | 4.0 |
| Mass ratio of resins | Polyester resin/urethane resin | | | — | 0.00 | 0.00 | 0.00 | 0.06 | 0.38 | — |
| | (Meth)acrylic resin/urethane resin | | | — | 0.00 | 0.00 | 0.57 | 0.60 | — | — |
| | Urethane resin/pigment | | | 0.00 | 3.65 | 3.65 | 2.33 | 2.20 | 2.65 | 0.00 |
| | (Meth)acrylic resin/pigment | | | 3.65 | — | — | 1.33 | 1.33 | — | 2.65 |
| Storage stability | | | | A | C | C | C | C | A | A |
| Washing fastness | Polyester (white) | | | C | S | S | S | S | S | C |
| | Cotton (black) | | | S | S | S | S | S | S | S |
| Color development | Polyester (white) | | | S | S | S | S | S | S | S |
| | Cotton (black) | | | S | C | C | S | S | C | S |

As shown in the tables, it is evident that the black ink of each example has excellent storage stability, and that printed textile items having good washing fastness and color development can be made with various fabrics. In comparative example 1, which contained only the (meth)acrylic resin as the resin, the washing fastness decreased. In comparative examples 2 and 3, which contained only the urethane resin as the resin, the storage stability and color development decreased. In comparative example 4, which contained only the (meth)acrylic resin and the urethane resin as the resin, the storage stability decreased.

In comparative example 5, which had a mass ratio of the polyester resin relative to the urethane resin of less than 0.2, the storage stability decreased. In comparative example 6, which contained only the urethane resin and the polyester resin as the resin, the color development decreased. In comparative example 7, which contained only the (meth) acrylic resin and the polyester resin as the resin, the washing fastness decreased.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An aqueous ink for textile inkjet printing, comprising: a pigment, a binder resin, and water, wherein
the binder resin comprises: a water-dispersible (meth) acrylic resin, a water-dispersible urethane resin, and a water-dispersible polyester resin,
a mass ratio of the water-dispersible polyester resin relative to the water-dispersible urethane resin is at least 0.2, and
a mass ratio of the water-dispersible (meth)acrylic resin relative to the water-dispersible urethane resin is in a range from 0.2 to 5.

2. The aqueous ink for textile inkjet printing according to claim 1, wherein a mass ratio of the water-dispersible (meth)acrylic resin relative to the pigment is at least 1.

3. The aqueous ink for textile inkjet printing according to claim 1, wherein a mass ratio of the water-dispersible urethane resin relative to the pigment is at least 1.

4. The aqueous ink for textile inkjet printing according to claim 1, wherein the mass ratio of the water-dispersible polyester resin relative to the water-dispersible urethane resin is at least 0.3.

5. A method for producing a printed textile item, the method comprising applying the aqueous ink for textile inkjet printing according to claim 1 to a substrate using an inkjet method.

6. The method for producing a printed textile item according to claim 5, wherein, in the aqueous ink for textile inkjet printing, a mass ratio of the water-dispersible (meth)acrylic resin relative to the pigment is at least 1.

7. The method for producing a printed textile item according to claim 5, wherein, ir the aqueous ink for textile inkjet printing, a mass ratio of the water-dispersible urethane resin relative to the pigment is at least 1.

8. The method for producing a printed textile item according to claim 5, wherein, ir the aqueous ink for textile inkjet printing, the mass ratio of the water-dispersible polyester resin relative to the water-dispersible urethane resin is at least 0.3.

9. The method for producing a printed textile item according to claim 5, wherein the substrate comprises a fabric.

10. The aqueous ink of claim 1, wherein a mass ratio of the water-dispersible (meth)acrylic resin relative to the pigment is at least 0.58.

11. The aqueous ink of claim 1, wherein a mass ratio of the water-dispersible urethane resin relative to the pigment is at least 0.75.

12. The aqueous ink of claim 1, wherein a mass ratio of the water-dispersible polyester resin relative to the pigment is at least 0.5.

13. The aqueous ink of claim 1, wherein a total mass of the water-dispersible (meth)acrylic resin, water-dispersible urethane resin, and water-dispersible polyester resin relative to the pigment is at least 3.

14. The aqueous ink of claim 1, wherein the mass ratio of the water-dispersible (meth)acrylic resin to the water-dispersible urethane resin is from 0.25 to 2.57.

15. The aqueous ink of claim 1, wherein a mass ratio of the water-dispersible (meth)acrylic resin relative to the pigment is from 0.58 to 1.93.

16. The aqueous ink of claim 1, wherein a mass ratio of the water-dispersible urethane resin relative to the pigment is from 0.75 to 2.33.

17. The aqueous ink of claim 1, wherein a mass ratio of the water-dispersible polyester resin relative to the pigment is from 0.5 to 1.0.

18. The aqueous ink of claim 1, wherein a total mass of the water-dispersible (meth)acrylic resin, urethane resin, and polyester resin relative to the pigment is at least 1.0.

19. The aqueous ink of claim 1, wherein a total mass of the water-dispersible (meth)acrylic resin, urethane resin, and polyester resin relative to the pigment is from 3.0 to 4.0.

* * * * *